Dec. 10, 1963 J. BRADWAY 3,113,727
ILLUMINATING APPARATUS FOR VEHICLE HUB CAPS
Filed June 27, 1961 3 Sheets-Sheet 1
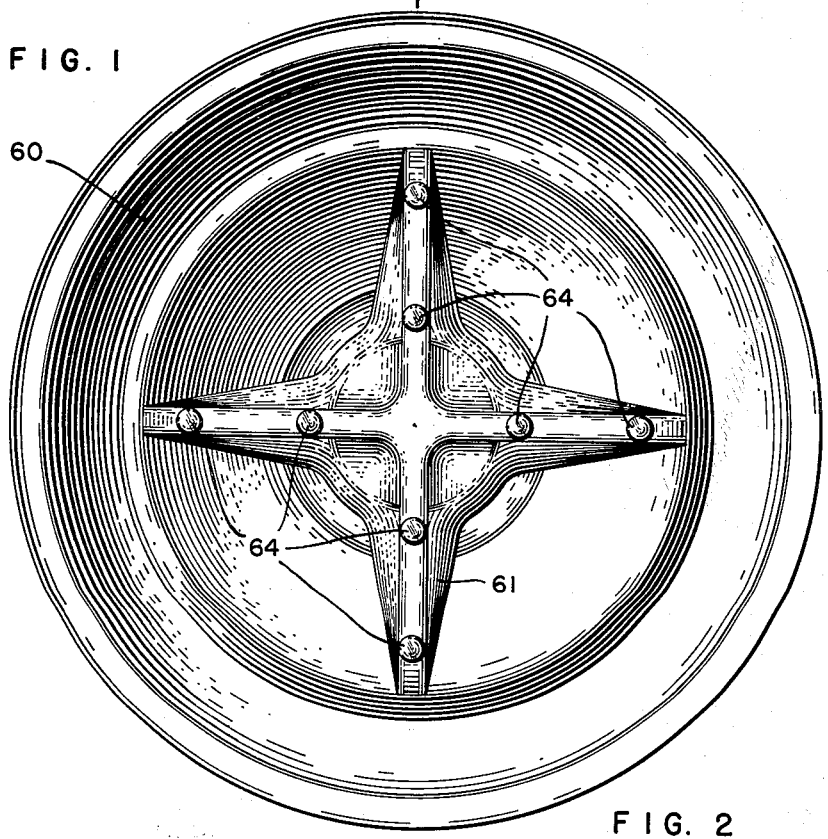
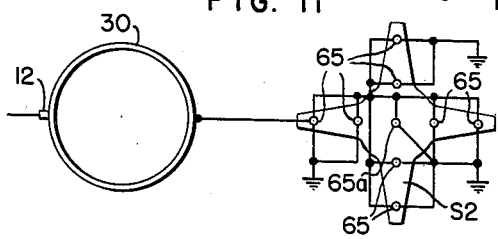
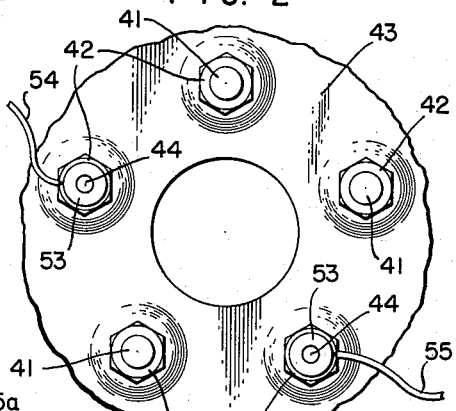
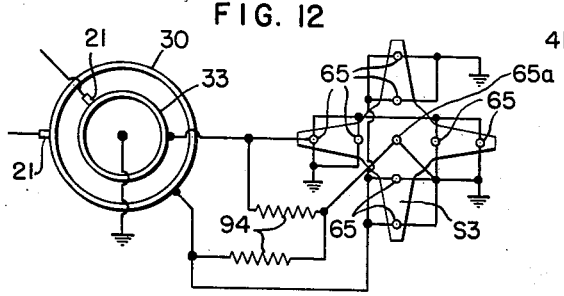
INVENTOR.
*JOSEPH BRADWAY*
BY
ATTORNEY.

Dec. 10, 1963 J. BRADWAY 3,113,727
ILLUMINATING APPARATUS FOR VEHICLE HUB CAPS
Filed June 27, 1961 3 Sheets-Sheet 2
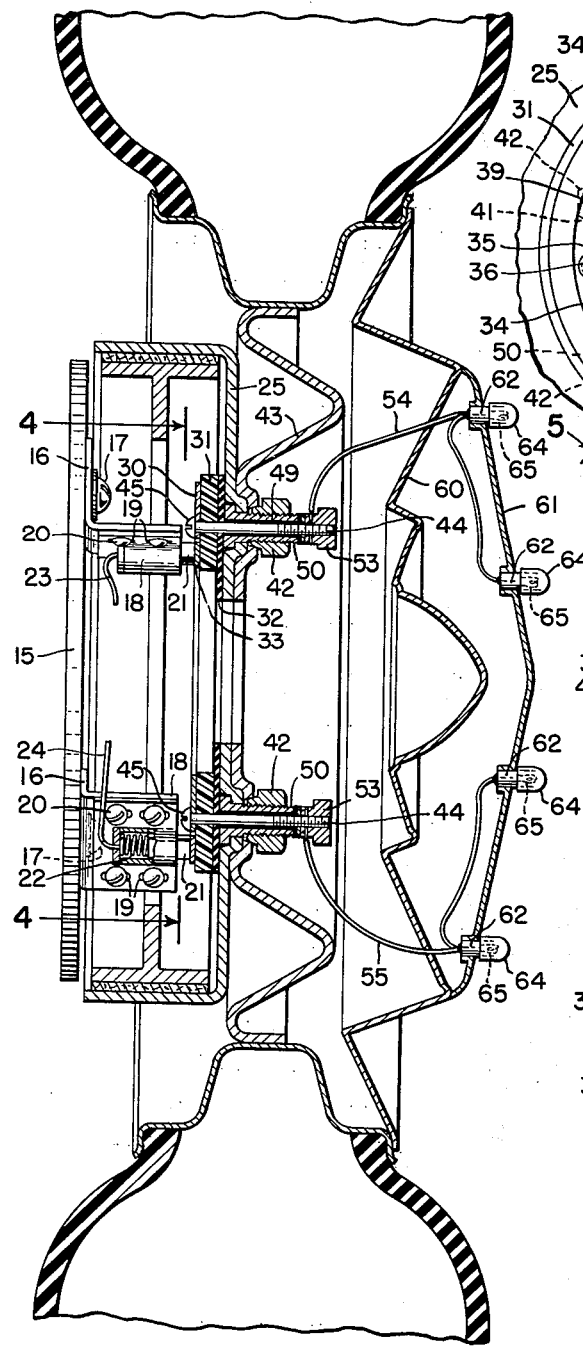
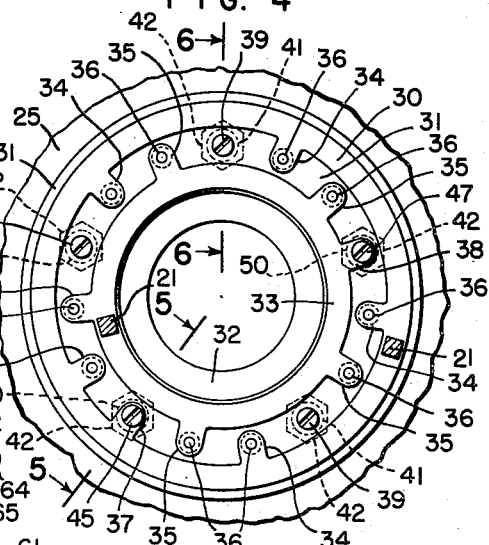
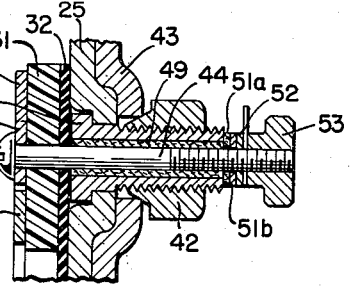
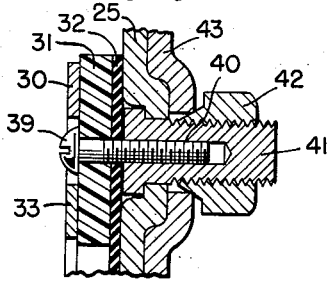
INVENTOR.
JOSEPH BRADWAY
BY
ATTORNEY Dec. 10, 1963  J. BRADWAY  3,113,727
ILLUMINATING APPARATUS FOR VEHICLE HUB CAPS
Filed June 27, 1961  3 Sheets-Sheet 3
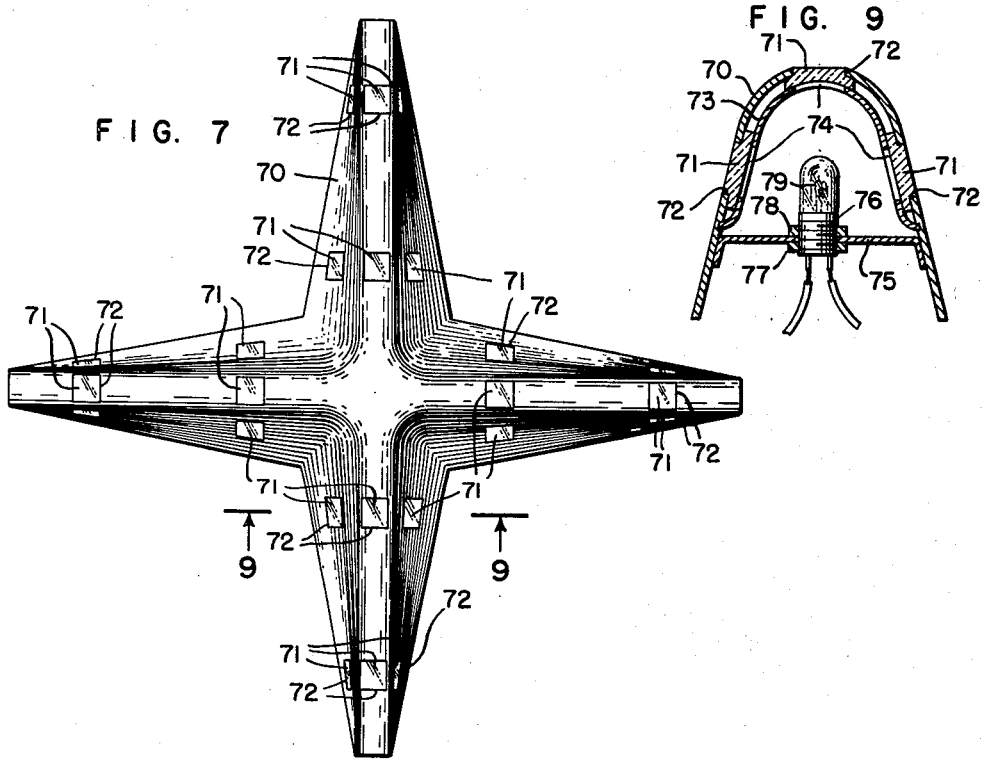
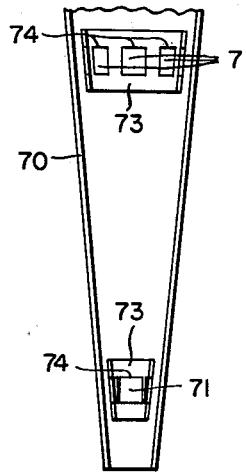
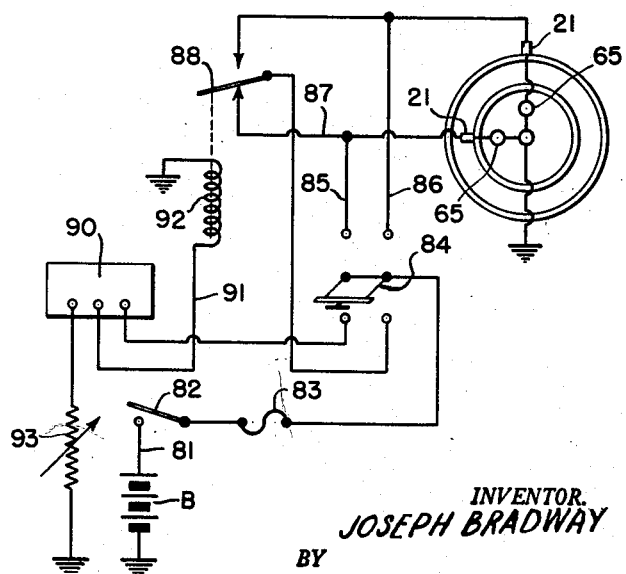
INVENTOR.
JOSEPH BRADWAY
BY
ATTORNEY.

United States Patent Office 3,113,727
Patented Dec. 10, 1963

3,113,727
ILLUMINATING APPARATUS FOR
VEHICLE HUB CAPS
Joseph Bradway, 99 Vine St., Bridgeton, N.J.
Filed June 27, 1961, Ser. No. 119,917
11 Claims. (Cl. 240—8.12)

This invention relates to electric lighting systems for hub caps of automobiles, and more particularly, to such apparatus which may be readily installed on vehicles now in use, or on new vehicles.

It is the principal object of the present invention to provide improved electric lighting apparatus for hub caps of automotive vehicles which improve the appearance of the vehicle during night operation.

It is a further object of the present invention to provide apparatus as aforesaid which may be made available in kit form for installation on various makes and models of automobiles.

It is a further object of the present invention to provide lighting apparatus for hub caps which is constructed in such a manner that it can be readily installed and when it is installed is protected from damage or injury.

It is a further object of the present invention to provide electric lights on the hub caps of automotive vehicles that can be continuously lighted or intermittently lighted as desired.

It is a further object of the present invention to provide electric lights on the hub caps of automotive vehicles in which a plurality of alternately operated circuits are included to obtain a flashing action.

It is a further object of the present invention to provide an electric light installation for the hub caps of automotive vehicles in which the lights can be quickly and easily replaced if required.

It is a further object of the present invention to provide apparatus of the character aforesaid which is free from electrical hazards in use.

It is a further object of the present invention to provide apparatus of the character aforesaid which does not interfere with the operation or servicing of other parts of the automobile and which may be removed if desired and reinstalled on another vehicle.

It is a further object of the present invention to provide apparatus of the character of the aforesaid in which wear of the moving parts is reduced to a minimum, and in which the wear which occurs at the brushes is negligible.

Other objects and advantageous features of the invention will be apparent from the description and claims.

The nature and characteristic features of the invention will be more readily understood from the following description taken in connection with the accompanying drawings forming part thereof, in which:

FIGURE 1 is a side elevational view of a portion of an automotive vehicle wheel equipped with the apparatus of the present invention applied thereto;

FIG. 2 is a fragmentary elevational view of the hub portion of a wheel shown in FIG. 1 with the hub cap removed;

FIG. 3 is a transverse sectional view taken approximately on the line 3—3 of FIG. 1;

FIG. 4 is a fragmentary sectional view taken approximately on the line 4—4 of FIG. 3;

FIG. 5 is a fragmentary sectional view, enlarged, taken approximately on the line 5—5 of FIG. 4;

FIG. 6 is a fragmentary sectional view, enlarged, taken approximately on the line of 6—6 of FIG. 4;

FIG. 7 is a view of another form of attachment for use in connection with the invention;

FIG. 8 is a fragmentary interior view of a portion of the structure shown in FIG. 7;

FIG. 9 is a transverse sectional view taken approximately on the line 9—9 of FIG. 7;

FIG. 10 is a wiring diagram of the electrical connections which are preferably employed;

FIG. 11 is a wiring diagram of another arrangement for energizing the lamps; and FIG. 12 is a wiring diagram showing another arrangement for wiring the lamps in different spinner arms.

It should, of course, be understood that the description and drawings herein are illustrative merely, and that various modifications and changes can be made in the structure disclosed without departing from the spirit of the invention.

Like numerals refer to like parts throughout the several views.

The apparatus, in accordance with the present invention, is preferably made up in kit form with the necessary component parts included for installation by the user, and with a minimum of changes and additions in the existing vehicular construction for the purpose of installation.

Referring now more particularly to FIGS. 3 to 6, inclusive, of the drawings, a wheel brake support plate 15 of conventional type on automotive vehicles is illustrated and serves as a support for brush holder supporting brackets 16 held in position on the plate 15 by screws 17 extending through elongated slots and into holes drilled, if necessary, in the wheel brake support plate 15 for purposes of installation of the present equipment, most plates 15, however, having holes available for this purpose.

The brackets 16 have adjustably connected thereto brush holders 18, the holders, 18 having elongated slots 19 through which mounting screws 20 extend into threaded engagement in the brush holders 18.

The slots 19 permit of the desired adjustment, and the screws 20 retain the brush holders 18 in adjusted positions. The brush holders 18 are of non-conducting or insulating material and are provided with brushes 21 resiliently urged by springs 22 to the right as seen in FIG. 3, and have conductors 23 and 24, respectively, connected thereto for purposes to be described.

On the interior of the conventional brake drum 25, a ring assembly is provided which preferably includes an outer conductor ring 30, an insulating spacer ring 31 of synthetic plastic or other suitable insulating material, an insulating cushioning ring 32, and an inner conductor ring 33.

The outer conductor ring 30 is preferably provided with a plurality of radially inwardly extending mounting ears 34, and the inner conductor ring 33 is preferably provided with a plurality of radially outwardly extending mounting ears 35 for securing the same in position with respect to the insulating ring 31, such as by screws 36 extending in threaded engagement into the ears 34 and 35.

The outer conductor ring 30 is preferably provided with a contact ear 37, and the inner conductor ring 33 is preferably provided with a contact ear 38.

The ring assembly is preferably held in position with respect to the brake drum 25 by a plurality of screws 39 which are in direct engagement with the insulating spacer ring 31, and extend into openings 40 in lug bolts 41. The lug bolts 41 are provided for this purpose, and the conventional lug nuts 42 act therewith to hold the wheel hub 43 in position. (See FIG. 6.)

A screw 44 is provided having a head 45 in engagement with the conductor ear 37, and a screw 46 is provided having a head 47 in engagement with the conductor ear 38. The screws 44 and 46 extend through the spacer ring 31, through the insulating and cushioning ring 32, and through an insulating sleeve 49 in a hollow lug bolt 50. (See FIG. 5.) An insulating washer 51a, metal washer 51b, and nut 52 are provided on the ends of the screws 44, and thumb nuts 53 can be provided for the attachment of conductors 54 and 55, as hereinafter explained.

The hollow lug bolts 50 are also adapted to cooperate with the conventional lug nuts 42 for retaining the wheel in position. The lug bolts 41 and the lug bolts 50 are preferably substituted for the conventional lug bolts in common use for retaining the wheel and the brake drum in assembled relation.

A hub cap 60 which is provided, may be of conventional type, having a plurality of hollow arms 61 exteriorly disposed thereon of the type frequently referred to as spinners. Any desired number of arms 61 may be employed.

As shown in FIG. 3, the spinner arms 61 are provided with a plurality of lamp sockets 62 grounded to the spinner arms 61 and therethrough to the hub cap 60. The hub cap 60 is grounded to the frame of the vehicle by reason of the metallic contacting surfaces, and a suppressor (not shown) may be employed to insure grounding around the wheel bearing. The lamp sockets 62 have transparent covers 64 and incandescent lamps 65 therein.

Referring now more particularly to FIGS. 7, 8 and 9 of the drawings, the spinner there shown is adapted for different lighting effects and includes spinner arms 70 with transparent window sections 71 which may be held in position in openings 72 by interiorly disposed spring arms 73 having openings 74 for access of light from the interior.

The window sections 71 may be of any desired material, such as colored transparent synthetic plastic materials, and in each group may be the same or of different colors, as desired.

Interiorly disposed in each spinner arm 70 at each set of openings 74, lamp holder bracket plates 75 are provided for supporting lamp holders 76. Each lamp holder 76 has a threaded exterior portion 77 for the reception of a plurality of holding nuts 78.

Each lamp holder 76 is provided with an incandescent lamp 79 which may be grounded to the spinner arm 70 through the plate 75 and have a conductor 80 for energization of the lamp 79.

As previously pointed out, while various circuit arrangements can be employed, including the direct connection of the lamps to any suitable source of electrical energy, such as the battery of the electrical system of the vehicle, it is preferred that intermittent energization be effected of one or more sets of lamps in the spinner arms 61 or 70.

One suitable circuit arrangement is shown in FIG. 10, and includes a conductor 81 connected to any suitable source B of electrical energy, such as the automobile battery, through the ignition switch 82, with an interposed fuse 83. The conductor 81 is connected to one arm of a double interconnected pole double throw switch 84 whose positioning determines whether the illumination is continuous or intermittent.

A conductor 85 is provided extending to one of the brushes 21 which is in turn connected through one of the groups of lamps 65 and thence to ground. The other blade of the switch 84 is adapted for engagement with a contact from which a conductor 86 extends to another brush 21 which in turn provides energy for illuminating another set of lamps 65 which are also connected to ground.

The switch 84 also has contacts from one of which a conductor 87 extends to the armature 88 of a relay, and from the other of which a conductor extends to a flasher controller 90 for determining the timed energization and deenergization of the armature 88.

A conductor 91 extends from the flasher controller 90 to the winding 92 of the relay for controlling the position of the armature 88. A variable resistance 93 can be provided to control the speed of operation of the flasher controller 90.

In FIG. 11, another partial circuit arrangement is shown in which a single contact ring 30 is employed with a lamp 65a disposed at the center of the spinner $S_2$ with additional lamps 65 in the arms, the same all being connected in parallel.

In FIG. 12, another circuit diagram is shown diagrammatically with separate energizing circuits for lamps 65 in pairs of arms of the spinner $S_3$ and with a central lamp 65a energized from each of the separate lamp circuits through interposed resistors 94, one in each lamp circuit.

It will be noted that the installation of the equipment heretofore described can be readily effected and will fit practically any make or model car with very little necessity for change. It may be necessary to drill holes in the wheel brake support plate 15 for the screws 17 for mounting the brush holder supporting brackets 16 and the brush holders 18. The brush holders 18 can be easily adjusted for contact of the brushes 21 with the inner and outer conductor rings 30 and 33. The conductors 23 and 24 for this purpose can be run through the brake adjustment slots (not shown) in the support plates 15, or separate holes can be provided therefor, if desired, but this requires additional drilling.

The lug bolts 41 and 50 are inserted after assembly with the outer conductor ring 30, the insulating spacer ring 31, the insulating cushioning ring 32, the inner conductor ring 33 and the screws 39 and 45. The connection of the conductors 54 and 55 to the screws 44 can then be readily effected and the thumb nuts 53 tightened to provide the desired connections for groups of incandescent lamps 65. If at any time it is necessary to remove the hub cap 60 for changing the tire, this can be effected in the usual manner, the conductors 54 and 55 disconnected, the lug nuts 42 removed, and another wheel installed, the lug nuts 42 tightened in place and the hub cap 60 with its spinner arms 61 replaced ready for use.

The alternate energization of different groups of lamps can be effected, or the continuous energization effected determined by the positioning of the switch.

I claim:
1. Illuminating apparatus for the hub caps of wheels of motor vehicles in which the vehicle wheels have brake drums and a plurality of wheel mounting lug bolts engaging said brake drums comprising a spinner mounted on the hub cap and having a plurality of arms, incandescent lamps carried by each of said arms and grounded thereto, and means for energizing said lamps comprising a conductor, an insulated connector through one of said lug bolts, a feeder ring interiorly disposed in said brake drum, members for detachably connecting said feeder ring to a plurality of said lug bolts, said conductor being connected to said insulated connector, a brush carried by a fixed portion of the vehicle and engaging said feeder ring, and a connection to a source of electric energy.

2. Illuminating apparatus as defined in claim 1, in which the spinner has the incandescent lamps exteriorly disposed thereon.

3. Illuminating means as defined in claim 1, in which said spinner arms have the incandescent lamps interiorly disposed therein, and transparent members are provided in the walls of the spinner arms for illumination by said lamps.

4. Illuminating means as defined in claim 1 in which said brush has mounting members for radial and longitudinal axial adjustment with respect to said feeder ring.

5. Illuminating apparatus for the hub caps of wheels of motor vehicles in which the vehicle wheels have brake drums and a plurality of wheel mounting lug bolts engaging said brake drums comprising a spinner mounted on the hub cap and having a plurality of arms, connected groups of incandescent lamps carried by said arms and grounded thereto, and means for energizing said lamps comprising conductors connected to the respective groups, a plurality of feeder rings interiorly disposed in said brake drum, members for detachably connecting said feeder rings to a plurality of said lugs, said conductors being connected to said feeder rings, brushes carried by a fixed portion of the vehicle and in engagement respectively with said feeder rings, connections from said brushes to a source of electric energy, and switch means for connecting said source to said connections.

6. Illuminating apparatus as defined in claim 5, in which the spinner has the incandescent lamps exteriorly disposed thereon.

7. Illuminating means as defined in claim 5, in which said spinner arms have the incandescent lamps interiorly disposed therein, and transparent members are provided in the walls of the spinner arms for illumination by said lamps.

8. Illuminating apparatus as defined in claim 5, in which said switch means includes a selector member, said selector member controlling a device for alternatively energizing and de-energizing said feeder rings.

9. Illuminating apparatus as defined in claim 5, in which said switch means includes members for selectively continuously and alternatively intermittently energizing said feeder rings.

10. Illuminating apparatus as defined in claim 5, in which said feeder rings are mounted in spaced relation on an insulating supporting ring, and the members for detachably connecting the feeder rings are bolts in threaded engagement in the lug bolts.

11. Illuminating apparatus as defined in claim 5, in which said feeder rings are mounted in spaced relation on an insulating supporting ring, and the members for detachably connecting the feeder rings are bolts engaging the insulating supporting ring and in threaded engagement in the lug bolts, certain of said lug bolts having insulated conductors carried thereby.

References Cited in the file of this patent

UNITED STATES PATENTS

| | | |
|---|---|---|
| 2,005,421 | High | June 18, 1935 |
| 2,083,514 | Brown | June 8, 1937 |
| 2,210,718 | Henninger et al. | Aug. 6, 1940 |
| 2,228,437 | Blana | Jan. 14, 1941 |